Figure 8:
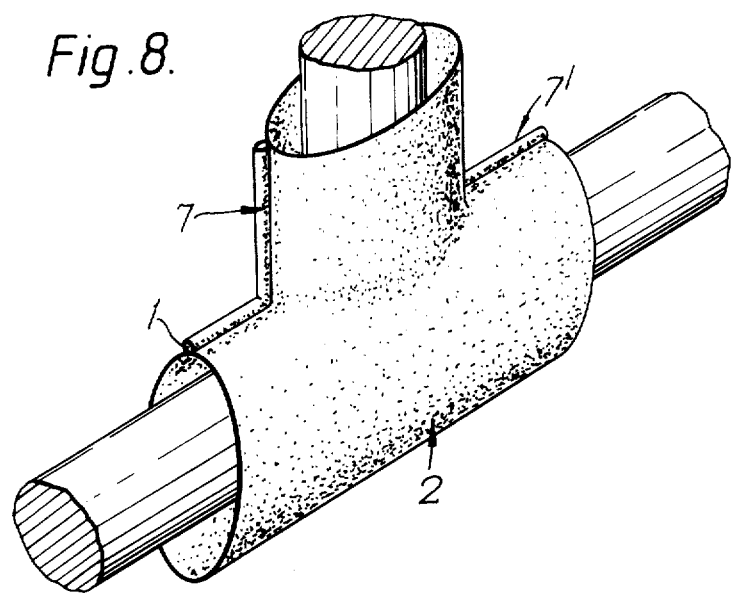

United States Patent [19]

Changani et al.

[11] 4,366,201
[45] Dec. 28, 1982

[54] HEAT SHRINKABLE WRAPAROUND CLOSURES

[75] Inventors: Pushpkumar D. Changani, Swindon; Donald G. Peacock, Kempsford; David Roberts, Swindon, all of England

[73] Assignee: Raychem Corporation, Menlo Park, Calif.

[21] Appl. No.: 172,898

[22] Filed: Jul. 28, 1980

[51] Int. Cl.³ .......................... B32B 1/08; B32B 3/10
[52] U.S. Cl. ........................ 428/157; 24/16 PB; 24/265 A; 156/86; 156/163; 156/229; 156/308.2; 264/230; 428/167; 428/192; 428/212; 428/913
[58] Field of Search ............. 156/86, 160, 163, 229, 156/257, 308.2; 24/265 R, 265 A, 16 PB; 264/229, 230; 428/157, 167, 192, 212, 913

[56] References Cited

U.S. PATENT DOCUMENTS

| | | | |
|---|---|---|---|
| 2,943,371 | 7/1960 | Patterson | 26/16 PB |
| 3,106,941 | 10/1963 | Plummer | 156/257 |
| 3,239,125 | 6/1966 | Sherlock | 228/56 |
| 3,243,211 | 6/1966 | Wetmore | 287/78 |
| 3,253,618 | 11/1966 | Cook | 138/125 |
| 3,253,619 | 11/1966 | Cook et al. | 138/125 |
| 3,305,625 | 4/1967 | Ellis | 174/84 |
| 3,316,343 | 5/1967 | Sherlock | 174/84 |
| 3,382,121 | 6/1968 | Sherlock | 156/165 |
| 3,396,894 | 9/1968 | Ellis | 228/56 |
| 3,448,182 | 4/1969 | Derbyshire | 264/22 |
| 3,451,609 | 7/1969 | Gillett | 228/56 |
| 3,455,336 | 7/1969 | Ellis | 24/16 PB |
| 3,501,565 | 2/1970 | Kalwaites | 264/288 |
| 3,525,799 | 7/1970 | Ellis | 174/84 |
| 3,587,657 | 6/1971 | Staller | |
| 3,654,017 | 1/1972 | Ropiequet | 156/251 |
| 3,678,174 | 4/1972 | Ganzhorn | 174/84 R |
| 3,709,556 | 11/1973 | Evans et al. | 264/230 |
| 3,721,749 | 5/1973 | Clabburn | 174/88 R |
| 3,818,123 | 7/1974 | Maltz | 174/88 C |
| 3,872,194 | 6/1975 | Lowry | 264/22 |
| 3,899,807 | 7/1975 | Sovish | 24/255 C |
| 3,948,709 | 4/1976 | Ida | 156/209 |
| 3,949,110 | 5/1976 | Nakajima | 428/36 |
| 3,959,052 | 5/1976 | Stanek | 264/230 |
| 3,995,964 | 10/1976 | De Groef | 403/272 |
| 4,101,699 | 10/1978 | Stine | 428/36 |
| 4,168,192 | 9/1979 | Nyberg | 156/86 |
| 4,194,039 | 3/1980 | Mueller | 156/229 |
| 4,241,119 | 12/1980 | Smart | 156/86 |

FOREIGN PATENT DOCUMENTS

| | | |
|---|---|---|
| 23418 | 9/1980 | European Pat. Off. |
| 2600647 | 6/1972 | Fed. Rep. of Germany |
| 2653940 | 9/1972 | Fed. Rep. of Germany |
| 2832485 | 7/1974 | Fed. Rep. of Germany |
| 2906450 | 7/1977 | Fed. Rep. of Germany |
| 2937749 | 9/1977 | Fed. Rep. of Germany |
| 1154280 | 10/1958 | France |
| 1591785 | 11/1969 | France |
| 518403 | 6/1958 | United Kingdom |
| 1046367 | 2/1966 | United Kingdom |
| 1342202 | 4/1974 | United Kingdom |

*Primary Examiner*—Jerome W. Massie
*Attorney, Agent, or Firm*—James W. Peterson

[57] ABSTRACT

A process for the production of a heat-recoverable wraparound closure having a closure means along at least one of a pair of opposed edge regions thereof which includes the steps of fusing together substantially non-cross-linked parts of a polymeric material which is or may be rendered heat-recoverable, or a substantially non-cross-linked part or parts of said material and at least one other substantially non-cross-linked polymeric material to produce the configuration of said closure means and subsequently cross-linking the substantially non-cross-linked polymeric material.

4 Claims, 9 Drawing Figures

U.S. Patent Dec. 28, 1982 Sheet 1 of 3 4,366,201
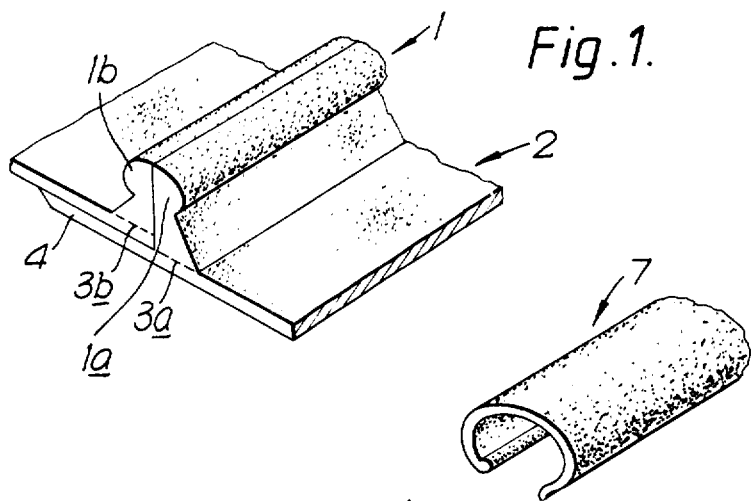
Fig.1.
Fig.2.
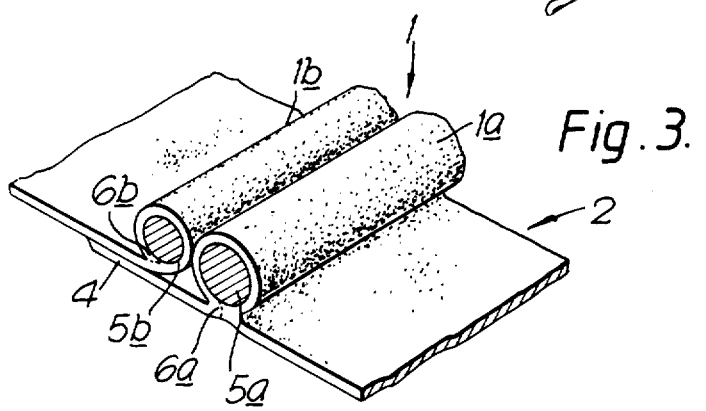
Fig.3.
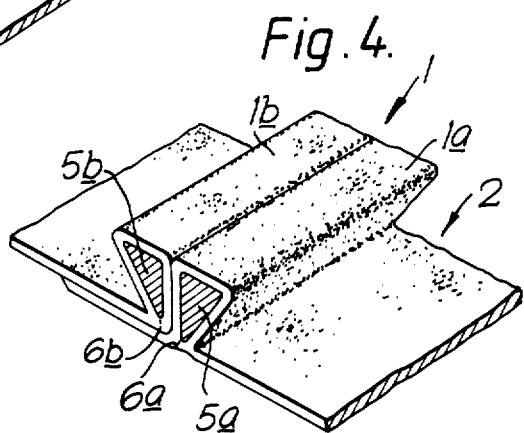
Fig.4.
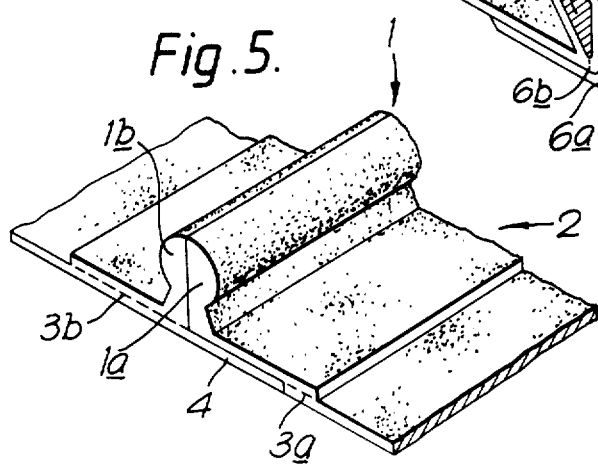
Fig.5.

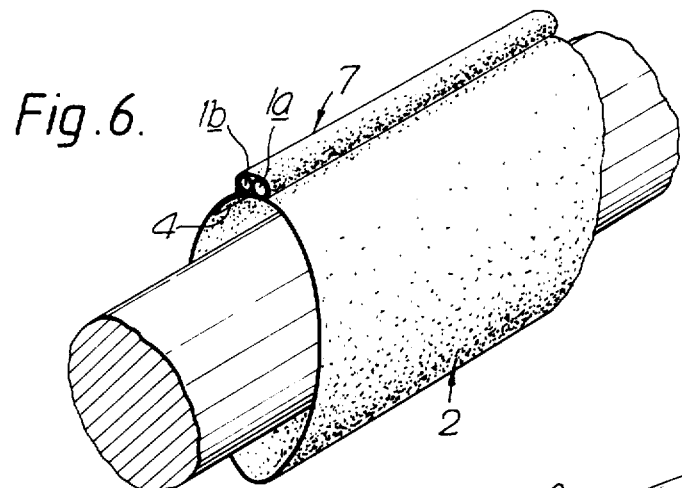
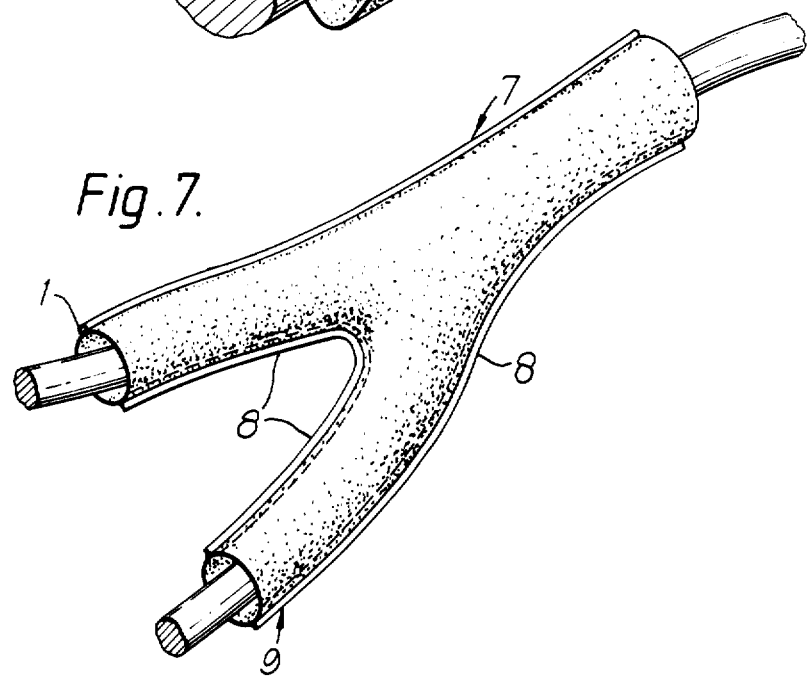

U.S. Patent Dec. 28, 1982 Sheet 3 of 3 4,366,201

HEAT SHRINKABLE WRAPAROUND CLOSURES

The present invention relates to heat-recoverable polymeric articles, that is to say polymeric articles the dimensional configuration of which may be made to change by subjecting to heat and in particular to heat-recoverable polymeric wraparound closures.

Heat-recoverable wraparound closures are employed for sealing, insulating or otherwise protecting a substrate where the use of a preformed tubular closure, such as a sleeve, is not possible or convenient, e.g. in the case where the end of an elongate substrate is not accessible. In general, such wraparound closure comprise at least a portion thereof which is adapted to be wrapped around a substrate to be covered and secured in tubular form by closure means. Thereafter, the wraparound closure may be heat-recovered tightly onto the substrate by the application of heat.

Examples of heat-recoverable wraparound closures are described in U.K. Pat. Nos. 3,379,218, 3,455,326, 3,530,898, 3,542,079 and 3,574,318 and in British Pat. Nos. 1,219,768 and 1,266,719 the disclosures of which are incorporated herein by reference. In general, the closure means employed in wraparound closures comprises at least one longitudinally extending profiled closure means extending along an edge region of the wraparound closure and interrupting the otherwise flat surface of said portion, e.g. a longitudinally extending rib.

Wraparound closures have hitherto generally been produced by forming a polymer into the desired heat stable configuration with integrally formed closure means, e.g. by extrusion or moulding, cross-linking the polymer in its heat stable configuration, heating the polymer to a temperature above the crystalline melting point or softening point of the polymer, deforming the polymer and cooling the polymer whilst in the deformed configuration. Such production involves difficulties in that deformation of the polymer must be carried out without deformation of the integrally formed closure means, moulding of individual items is often required and even when more economical extrusion processes are possible, different sizes of product often require different extrusion dies.

The present invention has as an object the provision of a more economical process for the production of heat-recoverable wraparound closures.

Accordingly, the present invention provides a process for the production of a heat-recoverable wraparound closure having a closure means along at least one of a pair of opposed edge regions thereof which includes the steps of fusing together substantially non-cross-linked parts of a polymeric material which is or may be rendered heat-recoverable, or a substantially non-cross-linked part or parts of said material and at least one other substantially non-cross-linked polymeric material to produce the configuration of said closure means and subsequently cross-linking the substantially non-cross-linked polymeric material.

In particular, the present invention provides a process for the production of a heat-recoverable wraparound closure having a closure means along at least one of a pair of opposed edge regions thereof which comprises deforming a substantially non-cross-linked polymeric material at a temperature below the crystalline melting point or softening point of the material to provide heat-recoverability, fusing together parts of the material or a part or parts of the material and at least one other substantially non-cross-linked polymeric material to produce the configuration of said closure means, and subsequently cross-linking the substantially non-cross-linked polymeric material.

By the expression "fusing together" as employed herein is meant a process wherein the materials in the parts to be fused together are caused to flow together, e.g. welding by heat, solvents or ultrasonic or radio frequency energy, preferably with the application of pressure, to form a homogeneous bridge between the parts in the absence of any discernible interface therebetween.

The fusion step may be effected before or after the deformation step, preferably however after the deformation step.

The process is particularly advantageous when the polymeric material is a polymeric web in which case a plurality of separable wraparound closures may simultaneously be produced so increasing efficiency. Such polymeric web may be deformed by stretching thereof or by thermoforming the desired form(s) in the web, e.g. by vacuum forming. In the case where a plurality of separable closures are simultaneously produced from a polymeric web, the closure means may be provided by fusing before separation of the closures. Preferably also, in such a case, cross-linking may be effected before separation of said closures.

In the case that a wraparound closure is required including tubular appendages, such a closure may also be produced from a polymeric web by fusing together parts of the web or a part or parts of the web with another polymeric material before cross-linking of the material to produce the desired configuration in accordace with the process described and claimed in U.K. Patent Application No. 8,024,623 filed July 28, 1980 (our case reference RK121 filed on even date herewith and entitled "Polymeric Articles").

Preferably the closure means comprises a pair of ribs each of which is disposed along an edge region of the closure and which are adapted to abut and co-operate in the assembled closure to provide a rail over which may be located, e.g. by sliding, a channel to secure the ribs together and maintain the wraparound closure intact.

Said ribs may each be formed by welding along an edge region of the closure a strip of polymeric material. Alternatively, said ribs may each be formed by wrapping an edge region of the polymeric material around a rigid former, e.g. a polymeric or metal rod, and fusing said edge region to itself and/or to the former to hold the former in place.

Preferably the or one of the closure means is spaced apart from an edge of the polymeric material to provide a flap adapted to underlie the wraparound closure on assembly thereof and so improve environmental sealing.

The process is applicable to both crystalline and non-crystalline polymers, the crystalline melting point or softening point being selected accordingly as the maximum deformation temperature.

By "substantially non-cross-linked" polymeric materials as employed herein is meant not cross-linked to the extent that the material cannot be readily bonded to itself or to another polymeric component by fusing. In general, the level of cross-linking in the polymeric material expressed in terms of gel content (ANSI/ASTM D2765-68) is preferably less than 40%, more preferably less than 20%, particularly less than 5%. When cross-linking in accordance with the process, preferably gel contents of at least 40%, e.g. at least 50%, particularly at least 65% are attained.

Heat-recoverable wraparound closures produced by the process of the invention also form part of the present invention.

One advantage of the articles of the invention is that they are substantially recoverable, e.g. recoverable to at least 50% of their maximum extent, at a temperature below the crystalline melting point or softening point of the polymeric material from which they have been produced, e.g. in the range 60° C. to the crystalline melting point or softening point.

The heat-recoverable wraparound closures produced in accordance with the process of the invention may advantageously be coated with a sealant or adhesive, e.g. an adhesive such as a hot-melt adhesive or a sealant such as a mastic (such as described in U.K. Pat. No. 1,116,878 the disclosure of which is incorporated herein by reference). The application of the adhesive or sealant may be effected before, during, or after the process of the invention by appropriate choice of adhesive or sealant and process conditions. For example, a hot-melt adhesive or mastic may be applied to the non-cross-linked polymeric material before the fusion step and thereafter the parts to be fused together locally heated and pressed together to locally displace the adhesive or sealant in the regions to be fused together.

Alternatively, the adhesive or sealant may be applied after the fusion step and, where the process involves producing a plurality of separable closures, the adhesive or sealant is preferably applied before separation of the articles.

Any cross-linkable polymeric material to which the property of dimensional recoverability may be imparted such as those disclosed in U.K. Specification No. 990,235 may be used to form the articles. Polymers which may be used in the polymeric material include polyolefins such as polyethylene and polypropylene, and ethylene copolymers, for example with propylene, butene, hexene, octene, vinyl acetate or other vinyl esters or methyl or ethyl acrylate, polyamides, polyurethanes, polyvinyl chloride, polyvinylidine fluoride, or other fluorinated polymers or copolymers, e.g. Tefzel (trade name—commercially available from Dupont), elastomeric materials such as those disclosed in U.K. Specification Nos. 1,284,082 and 1,294,665, and compositions such as those disclosed in our co-pending Applications Nos. 15122/77 and 37468/78. The polymeric materials can be tailored to suit the intended use by the addition of fillers, e.g. semiconducting fillers or anti-tracking agents, flame retardants, plasticisers, pigments, stabilisers and lubricants.

The polymeric material may be cross-linked by irradiation, for example, by means of an electron beam or by γ-radiation or it may be chemically cross-linked. Whichever cross-linking process is used, it may be advantageous to incorporate one or more co-curing agents from example polyunsaturated monomers such as triallyl cyanurate, triallyl isocyanurate, diallyl phthalate, ethylene glycol dimethacrylate, trimethylolpropane trimethacrylate, pentaerythritol tetramethacrylate, allyl methacrylate and vinyl methacrylate. One method of chemical cross-linking that may be used in the process according to the invention involves grafting an unsaturated hydrolysable silane on the polymer and subjecting the article to moisture during a curing stage, for example, as described in U.K. Patent Specification Nos. 1,286,460 and 1,357,549.

Any of the techniques conventionally employed for fusing together polymeric materials may be employed in the process of the present invention, e.g. radio frequency, ultrasonic or hot bar welding, and pressure may additionally be applied to ensure a satisfactory bond. Furthermore, it is possible to make use of the fusing operation to separate the articles one from another or from surplus polymeric starting material. For example, it is possible to use a heating/cutting device such as a hot wire cutter or a laser beam, if necessary in association with pressure applying means such as a roller.

As hereinbefore described, the process is particularly appropriate in the production of heat-recoverable wraparound closures articles for use in the electrical field, e.g. as splices and for pipe protection. In general, such products are characterised by a wall thickness before heat-recovery thereof of at least 0.05 mm preferably from 0.1 to 5 mm, especially from 0.5 to 3 mm e.g. 1 to 3 mm.

Figure 9:
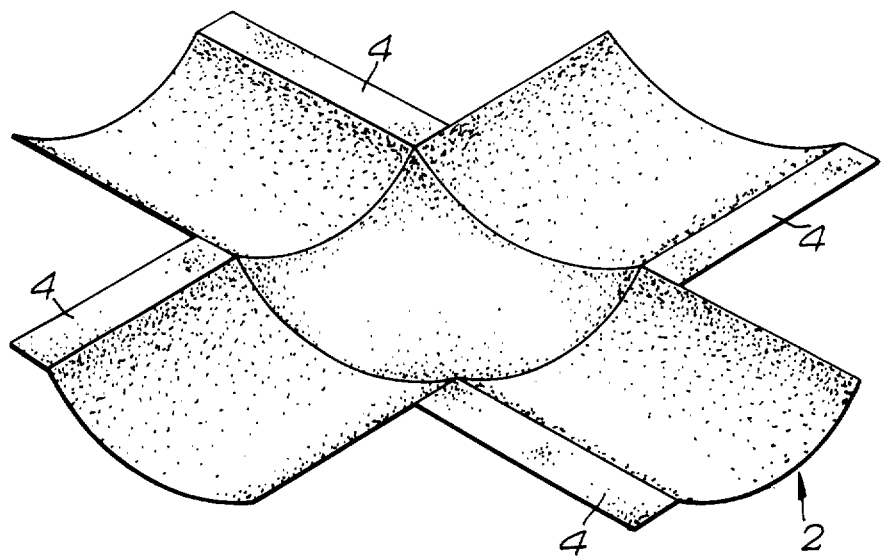

Specific embodiments of the process of the invention will now be described by way of example with specific reference to the accompanying drawings wherein:

FIG. 1 is a diagrammatic perspective part representation of a closure means for a wraparound closure according to a first embodiment, FIG. 2 is a diagrammatic perspective part representation means for a wraparound closure according to a second embodiment, FIG. 3 is a diagrammatic part representation of a closure means for a wraparound closure according to a second embodiment, FIG. 4 is a diagrammatic part representation of a closure means according to a third embodiment, FIG. 5 is a diagrammatic part representation of a closure means according to a fourth embodiment, FIG. 6 is a diagrammatic perspective representation of a heat-recoverable wraparound closure sleeve positioned about a pipe, FIG. 7 is a diagrammatic perspective representation of a heat-recoverable wraparound branch-off closure positioned about a cable branch-off, FIG. 8 is a diagrammatic perspective representation of a heat-recoverable wraparound "T" closure positioned about a pipe assembly "T" junction, and, FIG. 9 is a diagrammatic perspective representation of the closure of FIG. 8 having been vacuum formed.

With specific reference to the embodiment shown in FIG. 1, a closure means 1 is depicted comprising a pair of profiled non-cross-linked extruded polyethylene ribs 1a and 1b each of which is fused along an edge region of a non-cross-linked heat-recoverable polyethylene wraparound closure carcass 2. The polyethylene carcass is produced from polyethylene of the desired form by stretching thereof to 4 times the original length thereof at a temperature of 100° C. in a direction normal to that of the closure means and rapidly cooling whilst in the deformed condition. After deformation of the polyethylene, the closure ribs 1a and 1b are fused thereto by means of an ultrasonic welding tool. Welding may be effected over the whole area of contact 3a and 3b between the ribs 1 and the deformed polyethylene 2 or may be localised e.g. by spot welding or line welding. As will be apparent from the Figure, one rib 1b is disposed along one edge of the carcass 2, whilst the other rib 1a is spaced back therefrom to provide a flap 4 which is intended to underlie the assembled closure and so improve sealing. Also to improve sealing, as will be apparent from FIG. 1, rib 1a is greater in height than rib 1b by approximately the thickness of the carcass so that the flap 4 on assembly will pass smoothly under rib 1b in the absence of a pronounced step. After the ribs 1a and 1b have been fused to the polyethylene carcass, the carcass is coated on the inner surface thereof with a sealant which is relatively insensitive to electron radiation, and thereafter, the closure is irradiated by a 1.5 MeV electron beam to a dosage of 12 Mrads.

In use, the closure is wrapped around a substrate to be enclosed such that the ribs 1a and 1b abut and co-operate to provide a rail over which may be slid a channel as shown in FIG. 2 to maintain the ribs together. Thereafter, the wraparound closure may be subjected to heat, e.g. from a propane torch, to cause the closure to heat-recover about the substrate and provide a tight seal therefor.

The second embodiment depicted in FIG. 3 is similar in principle to that of the first embodiment, analogous reference numerals being employed for analogous parts. In the wraparound closure of the second embodiments, however, the ribs 1a and 1b are produced by wrapping the edge regions of the carcass 2 around metal formers 5a and 5b the carcass being welded to itself along the broken lines 6a and 6b to maintain the formers in position. Assembly is effected in analogous manner to that of the first embodiment.

The third embodiment shown in FIG. 4 is similar to the third embodiment with the exception that formers of triangular section are employed.

The forth embodiment shown in FIG. 5 is similar to the first embodiment hereinbefore described. In this embodiment however, rib 1a extends past the edge of the carcass to which it is welded so as to define a recess into which the flap 4 securely fits to present a smooth continuous surface to the substrate to which the closure is applied. In order to prevent flap 4 from creeping away from the edge against which it abuts on application of heat, the carcass is not deformed in the flap region, i.e. is not heat-recoverable.

In a modification of the fourth embodiment the flap 4 is formed integrally with rib 1b, the rib 1b being welded to the carcass in analogous fashion to the welding of rib 1a thereto.

FIGS. 6, 7 and 8 depict different wraparound closures in which each of the closures of the first, second, third and fourth embodiments may be employed, the same reference numerals being employed for analogous parts.

In the closure depicted in FIG. 6, the carcass 2 is formed from a continuous length of polyethylene in sheet form which has continuously been stretched by passing between rollers to produce a deformed length of sheet material from which a plurality of carcasses may be produced. To the length of a carcass so produced are welded the closure means as hereinbefore described, the sheet then being coated with sealant, subjected to electron irradiation as hereinbefore described and the sheet severed to separate the plural wraparound closures so produced. The closure depicted in FIG. 6 is shown in the heat-recoverable condition thereof.

After the closure is heated, the closure is caused to recover tightly enclosing the substrate and providing a seal against the influence of the environment.

In the embodiment depicted in FIG. 7 adapted to enclose a cable branch-off, the carcass again is formed from comtinuously stretched polyethylene sheet as described in relation to the embodiment shown in FIG. 6. In this embodiment however, after fusing the closure means in the appropriate positions, two such sheets are superimposed and welded together to yield welded seams 8 to define the configuration of the closure including a tubular appendage 9. Thereafter, surplus polyethylene sheet is removed, the closures are separated one from another by severing the sheets adjacent the weld seams and then are irradiated. If desired the resulting closures may be coated with a sealant or adhesive.

The closure is installed by sliding the free end of the branch-off cable through the tubular appendage 9, effecting the branch-off with the main cable, assembling the wraparound closure about the main cable and applying heat to cause recovery.

The closure depicted in FIG. 8, which is employed to seal a "T"-shaped pipe junction, is supplied with two sets of closure means 7 and $7^1$, the closure means being in accordance with any one of the first, second, third or fourth embodiments hereinbefore defined and the same reference numerals are employed for analogous parts. The carcass 2, is produced from polyethylene sheet which has been deformed by vacuum forming as shown in FIG. 9 at a temperature of 100° C. to provide approximately 50% expansion and thereafter rapidly cooling, the closure means then being fused to the sheet in the appropriate positions. The assembled wraparound closure is shown in FIG. 8 in heat-recoverable form, the application of heat causing the closure tightly to enclose the junction.

In each of the preceding embodiments, the wall thickness of the polyethylene after deformation may be 0.05 mm, 0.1 mm, 0.5 mm, 1.0 mm, 1.5 mm, 2.0 mm, 2.5 mm, 3.0 mm, 3.5 mm, 4.0 mm, 4.5 mm and 5.0 mm with similar results.

We claim:

1. A process for the production of a heat-recoverable wraparound closure, the wraparound closure including a carcass having opposed edge regions of initially fusion bondable polymeric material, the process for production comprising the steps of:

forming a projecting grippable rib on each opposed edge region by fusion of fusion bondable polymeric material to the fusion bondable polymeric material, one of said ribs being formed so that it is higher than the other rib by approximately the thickness of the carcass and wherein a portion of the carcass adjacent the higher rib extends beyond the edge region defining a flap for underlying the other end of the carcass thereby enabling the closure to be assembled smoothly, wherein prior to forming the ribs, the wraparound closure with the exception of the flap is deformed, said ribs cooperating to form a rail for the purpose of connection; and cross-linking the fused portion of the polymeric material.

2. A process for the production of a heat-recoverable wraparound closure, the wraparound closure including a carcass having opposed edge regions of initially fusion bondable polymeric material, the process for production comprising the steps of:

forming a projecting grippable rib on each opposed edge region by fusion of fusion bondable polymeric material to the fusion bondable polymeric material wherein a portion of the carcass adjacent one of the ribs extending beyond the edge region defines a flap for underlying the other end of the carcass thereby enabling the closure to be assembled smoothly and, wherein prior to forming the rib, the wraparound closure with the exception of the flap, is deformed, said ribs cooperating to form a rail for the purpose of connection; and cross-linking the fused portion of the polymeric material.

3. A heat-recoverable wraparound closure produced by the process of claim 1.

4. A heat-recoverable wraparound closure produced by the process of claim 2.

* * * * *